United States Patent
Kang et al.

(10) Patent No.: US 7,852,797 B2
(45) Date of Patent: Dec. 14, 2010

(54) APPARATUS AND METHOD FOR PROVIDING RELAY LINK ZONE INFORMATION IN A MULTI-HOP RELAY BROADBAND WIRELESS ACCESS COMMUNICATION SYSTEM

(75) Inventors: Hyun-Jeong Kang, Seoul (KR); Mi-Hyun Lee, Seoul (KR); Jae-Weon Cho, Suwon-si (KR); Sung-Jin Lee, Seoul (KR); Young-Bin Chang, Anang-si (KR); Joon-Young Choi, Suwon-si (KR); Hyoung-Kyu Lim, Seoul (KR); Yeong-Moon Son, Yongin-si (KR); Chang-Yoon Oh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 858 days.

(21) Appl. No.: 11/803,155

(22) Filed: May 11, 2007

(65) Prior Publication Data

US 2007/0280188 A1    Dec. 6, 2007

(30) Foreign Application Priority Data

| May 11, 2006 | (KR) | ................ 10-2006-0042217 |
| Mar. 29, 2007 | (KR) | ................ 10-2007-0031012 |
| Apr. 2, 2007 | (KR) | ................ 10-2007-0032415 |

(51) Int. Cl.
*H04B 7/14*    (2006.01)
(52) U.S. Cl. ............... 370/315; 370/328; 455/438
(58) Field of Classification Search ............... None
See application file for complete search history.

(56) References Cited

U.S. PATENT DOCUMENTS

| 5,504,935 A * | 4/1996 | Vercauteren ............... 455/438 |
| 2004/0192204 A1 | 9/2004 | Periyalwar et al. |
| 2005/0141593 A1 | 6/2005 | Pasanen et al. |
| 2006/0046643 A1 | 3/2006 | Izumikawa et al. |
| 2006/0153132 A1 | 7/2006 | Saito |

FOREIGN PATENT DOCUMENTS

| JP | 2005-223697 | 8/2005 |
| WO | WO 2005/067173 | 7/2005 |

* cited by examiner

*Primary Examiner*—Erika A Gary
(74) *Attorney, Agent, or Firm*—The Farrell Law Firm, LLP

(57) ABSTRACT

An apparatus and method for providing relay link zone information in a multi-hop relay BWA communication system, where a BS performs a network entry procedure with an RS during an initial access of the RS to the BS, generates a message including relay link zone information regarding a relay link zone in which the BS communicates with the RS, processes the message in a physical layer, and transmits the processed message to the RS.

38 Claims, 7 Drawing Sheets

APPARATUS AND METHOD FOR PROVIDING RELAY LINK ZONE INFORMATION IN A MULTI-HOP RELAY BROADBAND WIRELESS ACCESS COMMUNICATION SYSTEM

PRIORITY

This application claims priority under 35 U.S.C. §119 to an application filed in the Korean Intellectual Property Office on May 11, 2006 and assigned Serial No. 2006-42217, an application filed in the Korean Intellectual Property Office on Mar. 29, 2007 and assigned Ser. No. 2007-31012, and an application filed in the Korean Intellectual Property Office on Apr. 2, 2007 and assigned Serial No. 2007-32415, the contents of each of which are incorporated herein by reference.

BACKGROUND OF THE INVENTION

1. Field of the Invention

The present invention generally relates to a multi-hop relay Broadband Wireless Access (BWA) communication system, and in particular, to an apparatus and method for providing information about a relay link zone in which information to be relayed to a Mobile Station (MS) is sent.

2. Description of the Related Art

Providing services with diverse Quality of Service (QoS) requirements at or above 100 Mbps to users is an active study area for a future-generation communication system called a $4^{th}$ Generation (4G) communication system. In particular, active research is being conducted on providing high-speed service by ensuring mobility and QoS to a BWA communication system, such as Wireless Local Area Network (WLAN) systems, Wireless Metropolitan Area Network (WMAN) systems, etc. Such major examples comply with Institute of Electrical and Electronics Engineers (IEEE) 802.16d and IEEE 802.16e standards.

IEEE 802.16d and IEEE 802.16e communication systems are implemented by applying Orthogonal Frequency Division Multiplexing (OFDM)/Orthogonal Frequency Division Multiple Access (OFDMA) to physical channels. IEEE 802.16d considers only a single-cell structure with no regard to mobility of Subscriber Stations (SSs). In contrast, IEEE 802.16e supports mobility of SSs to the IEEE 802.16d communication system. A mobile SS is referred to below as an MS.

FIG. 1 shows a conventional IEEE 802.16e communication system configured in a multi-cell structure. The system shown in FIG. 1 includes cells 100 and 150, BSs 110 and 140 for managing the cells 100 and 150, respectively, and a plurality of MSs 111, 113, 130, 151 and 153. Signaling is carried out in OFDM/OFDMA between the BSs 110 and 140 and the MSs 111, 113, 130, 151 and 153. The MS 130 exists in a cell boundary area between the cells 100 and 150, i.e. in a handover region. When the MS 130 moves to the cell 150 managed by the BS 140 during signal transmission/reception to/from the BS 110, the serving BS of the MS 130 changes from the BS 110 to the BS 140.

Since signaling in FIG. 1 is performed between an MS and a fixed BS via a direct link, a highly reliable radio communication link can be established between them in the conventional IEEE 802.16e communication system. However, due to the fixedness of BSs, a wireless network cannot be configured with flexibility. As a result, the IEEE 802.16e communication system is not effective in efficiently providing communication services under a radio environment experiencing a fluctuating traffic distribution and a great change in the number of calls.

The above problem can be solved by applying a multi-hop relay data transmission scheme using fixed Relay Stations (RSs), mobile RSs, or general MSs to general cellular wireless communication systems, such as IEEE 802.16e. A multi-hop relay wireless communication system can advantageously reconfigure a network rapidly according to a communication environmental change and enables efficient operation of the whole wireless network. For example, a multi-hop relay wireless communication system can expand cell coverage and increase system capacity. When the channel status between a BS and an MS is bad, an RS can be installed between them so the resulting establishment of a multi-hop relay path through the RS renders a higher-speed radio channel available to the MS. With the use of a multi-hop relay scheme at a cell boundary offering a bad channel status, high-speed data channels can be provided and the cell coverage can be expanded.

Now a description will be made of the configuration of the multi-hop relay wireless communication system which expands cell coverage of BSs.

FIG. 2 shows a conventional multi-hop relay BWA communication system configured to expand the cell coverage of BSs. The multi-hop relay BWA communication system, which is configured in a multi-cell structure, includes cells 200 and 240, BSs 210 and 250 for managing the cells 200 and 240, respectively, a plurality of MSs 211 and 213 within the coverage area of the cell 200, a plurality of MSs 221 and 223 managed by the BS 210 but located in an area 230 outside the cell 200, an RS 220 for providing multi-hop relay paths between the BS 210 and the MSs 221 and 223 within the area 230, a plurality of MSs 251, 253 and 255 within the coverage area of the cell 240, a plurality of MSs 261 and 263 managed by the BS 250 but located in an area 270 outside the cell 240, and an RS 260 for providing multi-hop relay paths between the BS 250 and the MSs 261 and 263 within the area 270. OFDM/OFDMA signals are exchanged among the BSs 210 and 250, the RSs 220 and 260, and the MSs 211, 213, 221, 223, 251, 253, 255, 261 and 263.

Although the MSs 211 and 213 within the coverage area of the cell 200 and the RS 220 can communicate directly with the BS 210, the MSs 221 and 223 within the area 230 cannot communicate with the BS 210 directly. Therefore, the RS 220 covering the area 230 relays signals between the BS 210 and the MSs 211 and 223. Meanwhile, although the MSs 251, 253 and 255 within the coverage area of the cell 240, and the RS 260 can communicate directly with the BS 250, the MSs 261 and 263 within the area 270 cannot communicate with the BS 250, directly. Therefore, the RS 260 covering the area 270 relays signals between the BS 250 and the MSs 261 and 263.

In the multi-hop relay BWA communication system shown in FIG. 2, the RSs 220 and 260 are infrastructure RSs installed by service providers and are thus known to the BSs 210, 240 and 310, or client RSs acting as SSs or MSs, or as RSs under circumstances. The RSs 220 and 260 may also be fixed, nomadic (e.g. laptop), or mobile like MSs.

To expand cell coverage by use of an RS as described above, a conventional frame structure defined for communications between a BS and an MS should be extended to enable communications among a BS, an MS and an RS. In other words, a frame structure should be defined, which enables a BS to communicate with a plurality of RSs and MSs based on a single communication platform. To do so, a DownLink (DL) frame from the BS should be divided into a BS-MS communication zone and a BS-RS communication zone and an UpLink (UL) frame to the BS should be divided into an MS-BS communication zone and an RS-BS communication zone. That is, the RSs should be accommodated through appropriate division of limited resources. However, considering that the number of RSs connected to the BS and the channel environment are time-variant, i.e. the cell environment is very variable, it is inefficient to fix the BS-RS communication zone or the RS-BS communication zone. In this context, techniques for dynamically operating these zones have recently been proposed. Accordingly, a need exists for defining a signaling procedure for providing information about the zones to an RS.

SUMMARY OF THE INVENTION

The present invention substantially solves at least the above-described problems and/or disadvantages and provides at least the advantages below. Accordingly, an aspect of the present invention is to provide an apparatus and method for providing an RS with information about a relay link zone for communications between a BS and the RS in a multi-hop relay BWA communication system.

Another aspect of the present invention is to provide an apparatus and method for providing information about a relay link zone to an RS during initial access of the RS to a BS in a multi-hop relay BWA communication system.

A further aspect of the present invention is to provide an apparatus and method for, when a change occurs in size of a relay link zone in which communications are conducted between a BS and an RS, providing information about the size change to the RS in a multi-hop relay BWA communication system.

Still another aspect of the present invention is to provide an apparatus and method for, when a mobile RS performs a handover, providing the RS with information about a relay link zone for communications between the RS and a target BS in a multi-hop relay BWA communication system.

According to an aspect of the present invention, there is provided a communication method for a BS in a multi-hop relay cellular communication system, in which the BS performs a network entry procedure with an RS during an initial access of the RS to the BS, generates a message including relay link zone information regarding a relay link zone in which the BS communicates with the RS, processes the message in a physical layer, and transmits the processed message to the RS.

According to another aspect of the present invention, there is provided a communication method for a BS in a multi-hop relay cellular communication system, in which the BS determines whether to change a relay link zone in which the BS communicates with an RS, generates a message including relay link zone change information when the BS determines to change the relay link zone, processes the message in a physical layer, and broadcasts the processed message to RSs.

According to a further aspect of the present invention, there is provided a communication method for a BS in a multi-hop relay cellular communication system, in which the BS receives relay link zone information regarding a target BS from the target BS, when an RS performs a handover, generates a message including the relay link zone information regarding the target BS, processes the message in a physical layer, and transmits the processed message to the RS.

According to still another aspect of the present invention, there is provided a communication method for an RS in a multi-hop relay cellular communication system, in which the RS performs a network entry procedure with a BS during an initial access to the BS, receives a message including relay link zone information about a relay link zone for communications between the RS and the BS, and performs an RS operation in the relay link zone indicated by the relay link zone information.

According to yet another aspect of the present invention, there is provided a communication method for an RS in a multi-hop relay cellular communication system, in which the RS monitors reception of a message including relay link zone change information about a relay link zone for communications between the BS and the RS, detects a changed relay link zone from the message, upon receipt of the message, and performs an RS operation in a relay link zone indicated by the relay link zone change information.

According to still a further aspect of the present invention, there is provided a communication method for an RS in a multi-hop relay cellular communication system, in which the RS receives a message including relay link zone information regarding a target BS, when the RS performs a handover, detects a relay link zone for communications between the RS and the target BS from the received message, and performs an RS operation in the relay link zone after the handover.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention.

The present invention discloses a signaling procedure for providing a Relay Station (RS) with information about a relay link zone in which information to be relayed to a Mobile Station (MS) is sent in a multi-hop relay Broadband Wireless Access (BWA) communication system. The following description is made of a method for providing relay link zone information to an RS that initially accesses a Base Station (BS) and a method for, when a change occurs to size of the relay link zone, providing information about the size change to the RS. Further, when a mobile RS performs a handover to a target BS, a method for providing the RS with information about a relay link zone for communications with the target BS is provided.

The multi-hop relay BWA communication system operates in Orthogonal Frequency Division Multiplexing/Orthogonal Frequency Division Multiple Access (OFDM/OFDMA). In view of the nature of OFDM/OFDMA that sends physical channel signals on a plurality of subcarriers, the multi-hop relay BWA communication system is capable of high-speed data transmission and supports the mobility of MSs.

In the multi-hop relay BWA communication system, RSs are fixed or mobile nodes, or particular systems installed by BSs. Such a node serves as an RS through relay capability negotiations with a BS according to a preset criterion for cell coverage expansion.

While the present invention is described in the context of a multi-carrier BWA communication system as an example, the present invention may also be used with any cellular communication system using a multi-hop relay scheme.

Figure 1:
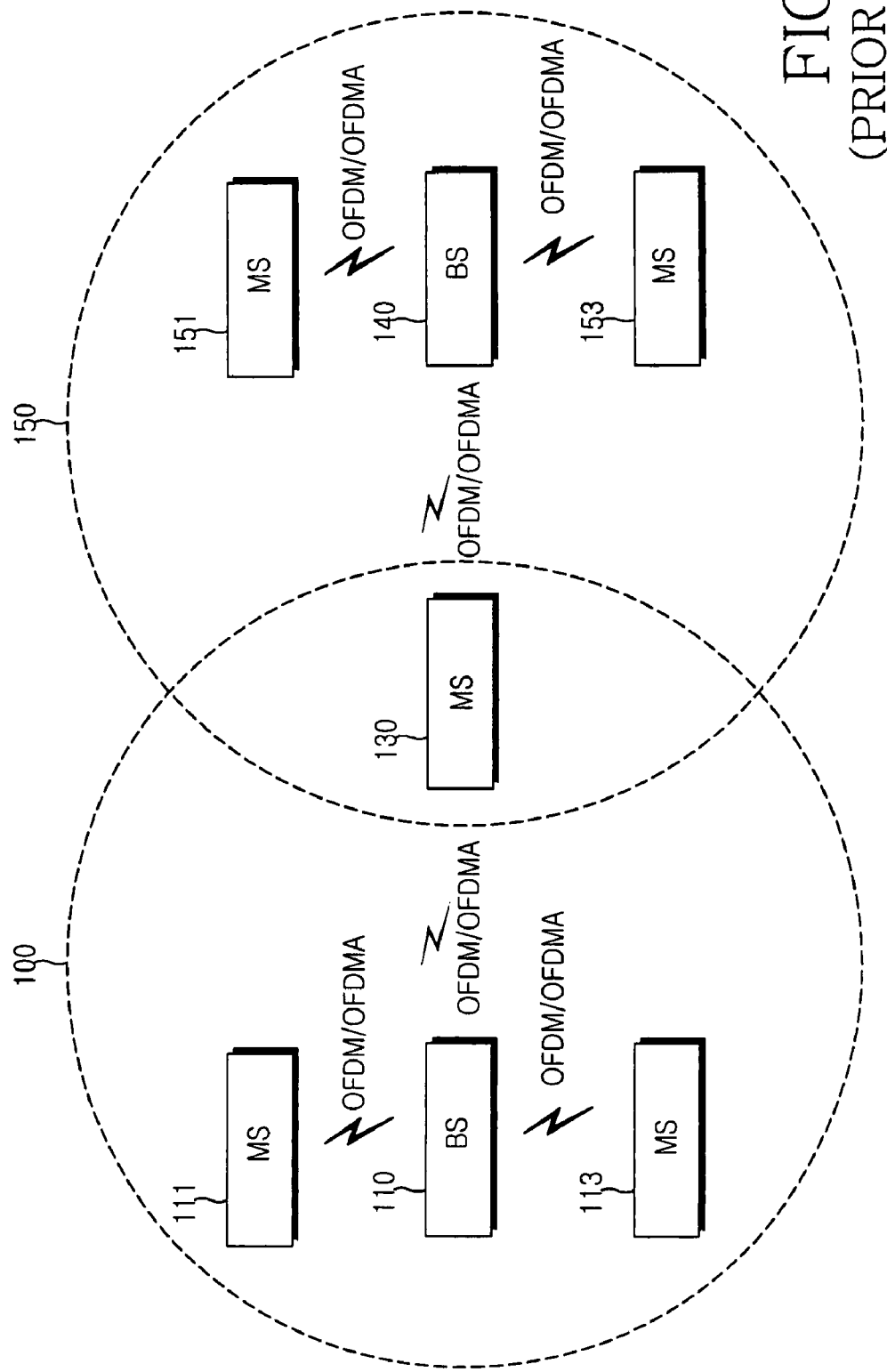
FIG. 1 illustrates a conventional IEEE 802.16e communication system.
Figure 2:
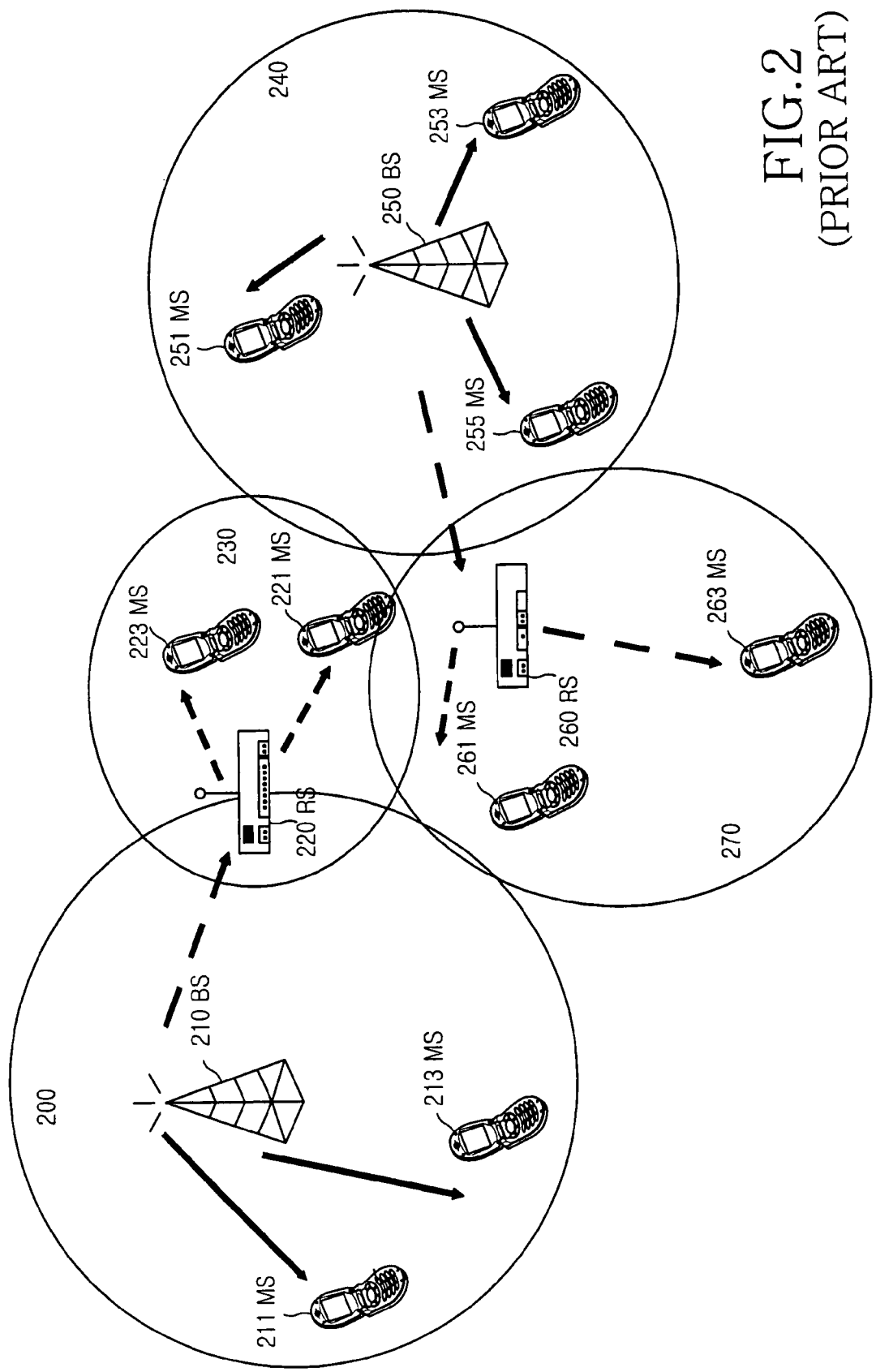
FIG. 2 illustrates a conventional multi-hop relay BWA communication system configured to expand the cell coverage of BSs.
Figure 3:
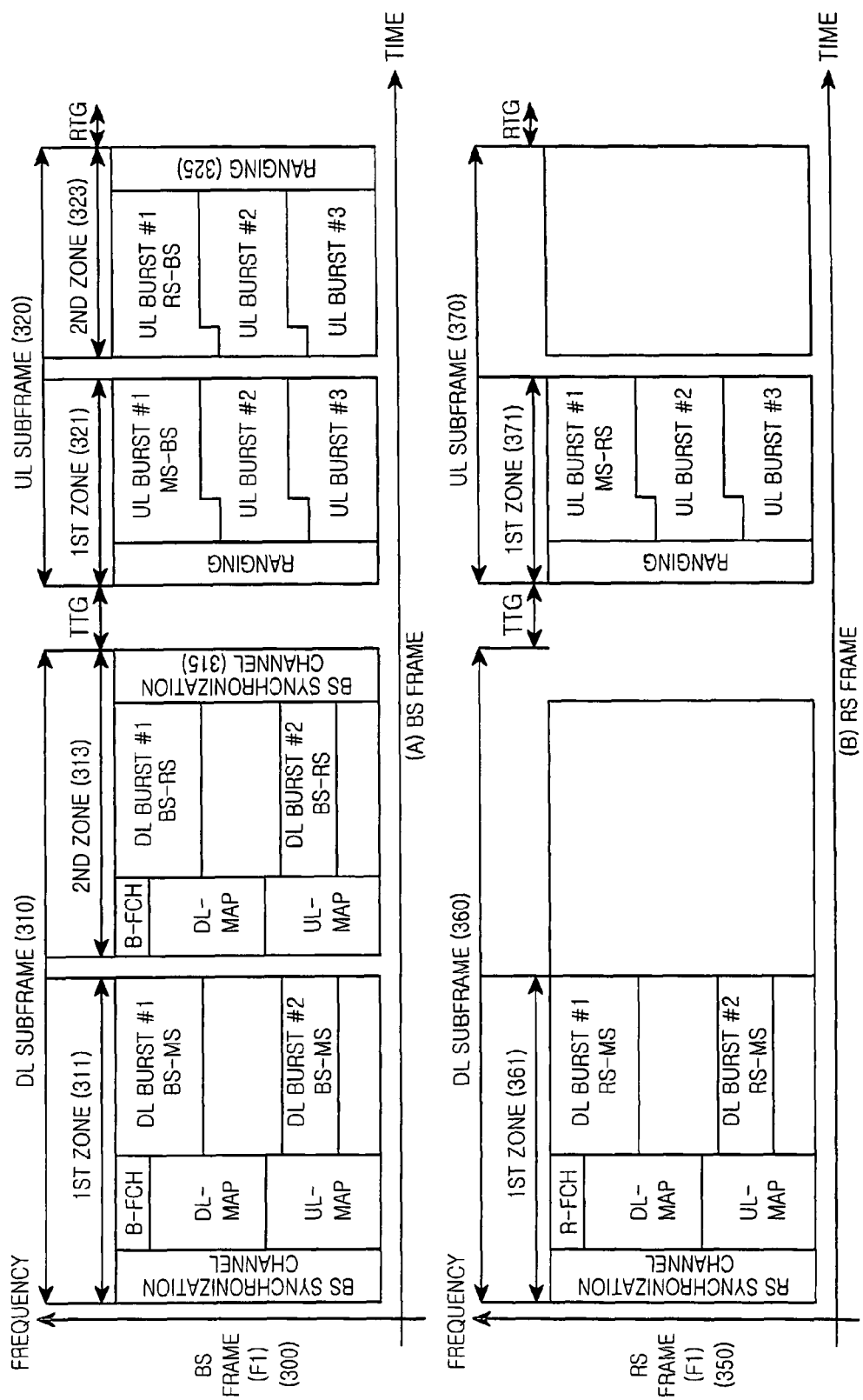
FIG. 3 illustrates a frame structure for providing synchronized synchronization channels to MSs or RSs in a multi-hop relay BWA communication systems according to the present invention.

FIG. 3 shows a frame structure for providing synchronized synchronization channels to MSs or RSs in a multi-hop relay BWA communication systems according to the present invention. A BS frame 300 is divided into a DownLink (DL) subframe 310 and an UpLink (UL) subframe 320. The DL subframe 310 is configured to provide a synchronization channel to an MS in the form of a preamble, for synchronization and cell search at the MS, and to provide a synchronization channel to an RS in the form of a postamble, for synchronization and cell search at the RS. With the fixed synchronization channels at the start and end of the DL subframe 310, the MS or the RS can acquire synchronization information and neighbor BS information.

The DL subframe 310 is divided into time-multiplexed first and second zones 311 and 313, and the UL subframe 320 is divided into time-multiplexed first and second zones 321 and 323. The lengths of the first and second zones 311, 321, 313 and 323 are fixed or dynamically changed according to cell environment.

In the BS frame 300, a BS communicates with an MS connected to the BS via a direct link in the first zones 311 and 321 and communicates with an RS in the second zones 313 and 323. Because the first and second zones 311, 321, 313 and 323 may vary in length according to the cell environment, the BS allocates the synchronization channels or ranging channels at the start of the first zones 311 and 321 and at the end of the second zones 313 and 323, thereby providing the synchronized synchronization channels to the MS and the RS. The ranging channels (or ranging slots) may reside at positions indicated by a control channel in the UL subframe 320, instead of fixed positions.

In an RS frame 350, the RS communicates with an MS connected to the RS via a direct link in first zones 361 and 371. To provide a synchronized synchronization channel to the MS, the RS allocates the synchronization channel or a ranging channel at the start of the first zones 361 and 371.

As stated earlier, since the first zones 311 and 321 and the second zones 313 and 323 of the BS frame 300, and the first zones 361 and 371 of the RS frame 350 may change in length dynamically according to the cell environment, the BS should inform the RS of a change in the zone sizes. Accordingly, there exists a need for defining a signaling procedure for providing information about a change in the sizes of communication zones to the RS in the relay system using the frame structures shown in FIG. 3.

Figure 4:
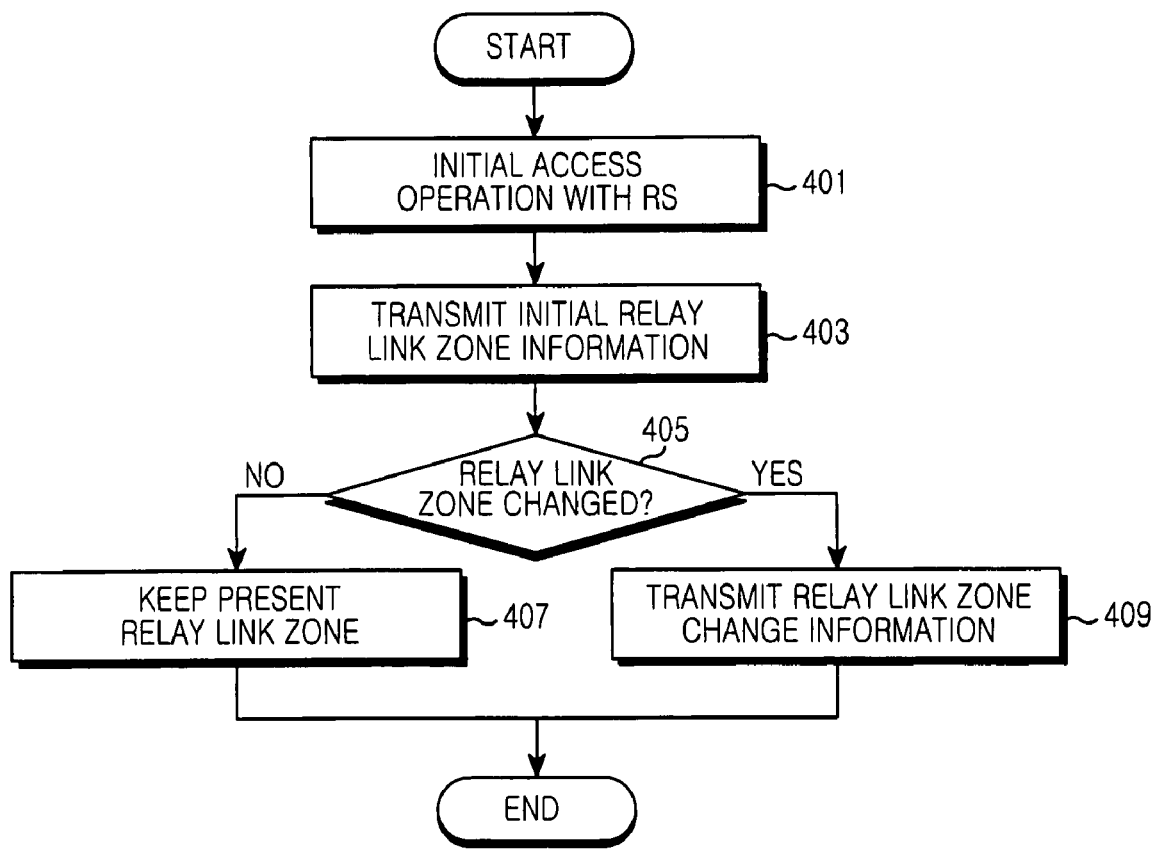
FIG. 4 is a flowchart illustrating an operation of a BS for providing relay link zone information to an RS in the multi-hop relay BWA communication systems according to the present invention.

FIG. 4 shows an operation of a BS for providing relay link zone information to an RS in the multi-hop relay BWA communication systems according to the present invention. The BS performs an initial access operation (i.e. network entry) with the RS in the first zones 311 and 321 of the BS frame 300 shown in (A) of FIG. 3 in step 401. That is, a necessary DL message is sent to the RS in the first zone 311 of the DL subframe 310 and a necessary UL message is sent to the BS in the first zone 321 of the UL subframe 320 during the initial access. When the RS is activated as a relay after the initial access, the BS communicates with the RS in relay link zones corresponding to the second zones 313 and 323 of the BS frame 300. In the mean time, the RS communicates with an MS in the first zones 361 and 371 of the RS frame 360.

After the initial access, the BS sends to the RS information about the relay link zone, i.e. the second zone 313 of the DL subframe 310 of the BS frame 300 in step 403.

The relay link zone information can be delivered by System Time Clock (STC)_DL_ZONE_IE designed to indicate a zone using a specific permutation or a specific transmit diversity mode. The STC_DL_ZONE_IE is configured as follows in Table 1 below.

TABLE 1

| Syntax | Size (bits) | Notes |
| --- | --- | --- |
| STC_DL_ZONE_IE( ) { | | |
| Extended DIUC | 4 | STC/DL_ZONE_SWITCH=0x01 |
| Length | 4 | Length=0x04 |
| OFDMA symbol offset | 8 | Denotes the start of zone (counting from the frame preamble and starting from 0) |
| Permutation | 2 | 0b00=PUSC permutation<br>0b01=FUSC permutation<br>0b10=Optional FUSC permutation<br>0b11=Optional adjacent subcarrier permutation |
| Use All SC indicator | 1 | 0=do not use all subchannels<br>1=use all subchannels |
| STC | 2 | 0b00=no STC<br>0b01=STC using 2/3 antennas<br>0b10=STC using 4 antennas<br>0b11=FHDC using 2 antennas |
| Matrix indicator | 2 | STC matrix<br>If (STC==0b01 or STC==0b10)<br>{ |

TABLE 1-continued

| Syntax | Size (bits) | Notes |
|---|---|---|
| | | 0b00=Matrix A |
| | | 0b01=Matrix B |
| | | 0b10=Matrix C |
| | | 0b11=reserved |
| | | } |
| | | else if (STC==0b11) |
| | | { |
| | | 0b00=Matrix A |
| | | 0b01=Matrix B |
| | | 0b10-11=reserved |
| | | } |
| DL_PermBase | 5 | |
| PRBS_ID | 2 | Value: 0..2 |
| AMC type | 2 | Indicates the AMC type in case permutation type=0b11, otherwise shall be set to 0. AMC type (NxM=N bits by M symbols) 0b00=1x6 0b01=2x3 0b10=3x2 0b11=reserved note that only 2x3 Band AMC subchannel type (AMC type=0b01) is supported by MS |
| Midamble presence | 1 | 0=not present 1=present at the first symbol in STC zone |
| Midamble boosting | 1 | 0=no boost 1=boosting (3 dB) |
| 2/3 antennas select | 1 | 0=STC using 2 antennas 1=STC using 3 antennas selects 2/3 antennas when STC=0b01 |
| Dedicated pilots | 1 | 0=pilot symbols are broadcast 1=pilot symbols are dedicated. An MS should use only pilots specific to its burst for channel estimation |
| RS DL zone indicator | 1 | Indicates the RS DL zone |
| Reserved | 3 | Shall be set to zero |
| } | | |

In Table 1, STC_DL_ZONE_IE includes OFDMA symbol offset indicating the start of the zone indicated by the Information Element (IE), Permutation indicating a permutation type used for the zone, and RS DL zone indicator indicating that the zone is a relay link zone.

Aside from the use of 1 bit as the RS DL zone indicator in the STC_DL_ZONE_IE shown in Table 1, a conventional message or a new message can be used to deliver the relay link zone information in step 403. For instance, the 1-bit RS DL zone indicator can be included in AAS_DL_IE designed to indicate an Adaptive Antenna System (AAS) zone. The AAS_DL_IE has the following configuration.

TABLE 2

| Syntax | Size (bits) | Notes |
|---|---|---|
| Downlink preamble coding | 2 | 0b00=0 symbols 0b01=1 symbol 0b10=2 symbols 0b11=3 symbols |
| Preamble type | 1 | 0-Frequency shifted preamble is used in this DL AAS zone 1-Time shifted preamble is used in this DL AAS zone |
| PRBS ID | 2 | Refer to 8.4.9.4.1 |
| RS DL zone indicator | 1 | Indicates the RS DL zone |
| } | | |

To send the relay link zone information to the RS, an RS DL zone indicator may be included in a Frame Control Header (FCH) and a relay link zone may be indicated by a Gap/Peak-to-Average Power Ratio (PAPR) reduction IE that specifies a Gap/PAPR reduction region. In this case, the FCH contains the following information shown in Table 3 below.

TABLE 3

| RS DL zone indicator | 1 bit | Indicates the RS DL zone |
|---|---|---|

Upon receipt of the FCH with RS DL zone indicator, the RS determines that a zone indicated by Gap/PAPR reduction IE in a DL-MAP is a relay link zone and operates as a relay in the relay link zone.

The Gap/PAPR reduction IE may serve the original purpose other than indicating the relay link zone. In this case, when a lower node (MS or RS) of the BS receives a signal in the zone indicated by the Gap/PAPR reduction IE, the lower node can neglect the signal. Hence, when the RS receives a plurality of Gap/PAPR reduction IEs from the BS or an upper RS, the RS should be able to distinguish a Gap/PAPR reduction IE that indicates a relay link zone from among the Gap/PAPR reduction IEs. To notify which Gap/PAPR reduction IE indicates the relay link zone, the RS DL zone indicator in the FCH can be used. Then, the FCH may contain the following RS DL Zone Indicator.

TABLE 4

| RS DL Zone indicator | x bits | Indicates the RS DL zone |
|---|---|---|

In Table 4, RS DL Zone indicator indicates that a Gap/PAPR reduction IE is included in the DL MAP and, when a plurality of Gap/PAPR reduction IEs are included, the RS DL Zone indicator identifies a Gap/PAPR reduction IE indicating the relay link zone.

For example, the RS DL Zone indicator occupies 2 bits and when the RS DL Zone indicator is set to 01, a first one of 5 Gap/PAPR reduction IEs in the DL-MAP indicates the relay link zone. Therefore, upon receipt of an FCH with the RS DL Zone indicator of 01, the RS determines that the first Gap/PAPR reduction IE in the DL-MAP indicates the relay link zone and operates as a relay in the indicated relay link zone.

While it has been described above that the RS DL zone indicator of the FCH and the Gap/PAPR reduction IE are used to indicate a relay link zone in the next frame, they may also be used to indicate a relay link zone in a second next, a third next, or any other following frame. A frame in which an indicated relay link zone resides can be indicated by a system initialization value or system information. The frame may be fixed or changed during system operation. In the latter case, the BS notifies its lower nodes of the change by system information or the like.

Meanwhile, when an MS receives the Gap/PAPR reduction IE with the relay link zone information, the MS considers that a zone indicated by the Gap/PAPR reduction IE is not valid for the MS.

In step 405, the BS determines whether to change a size of the relay link zone corresponding to the second zone 313 of the DL subframe 310 for the next frame. The BS maintains the current relay link zone in step 407 when the BS determines not to change the size of the relay link zone. The BS sends relay link zone change information to the RS in step 409 when the BS determines to change the size of the relay link zone.

A message notifying of the relay link zone change in the next frame is configured as follows in Table 5 below.

Referring to Table 5, the relay link zone change notification message called DL_Frame_Prefix is included in an FCH that the BS sends to the RS in the relay link zone. DL_Frame_Prefix contains used subchannel bitmap indicating a subchannel group to be used in the next frame, repetition_coding_indication indicating a repetition coding for a DL-MAP following DL_Frame_Prefix, coding_indication indicating a coding scheme for the DL-MAP, DL-MAP length indicating the length of the DL-MAP, and OFDMA symbol offset (or OFDMA symbol index) indicating the start of the relay link zone in the next frame. OFDMA symbol offset may notify whether the start offset is changed and how much the start offset is increased/decreased. For example, given an OFDMA symbol offset=0b00000, the OFDMA symbol offset implies that the start offset of the relay link zone is not changed in the next frame. When an OFDMA symbol offset=0b0xxxx, the OFDMA symbol offset implies that the start offset of the relay link zone is increased by xxxx symbols in the next frame. When an OFDMA symbol offset=0b1xxxx, the OFDMA symbol offset implies that the start offset of the relay link zone is decreased by xxxx symbols in the next frame. The OFDMA symbol offset can be set according to a link variation. Besides the sequential increase/decrease described in Table 5, the increase/decrease may happen in a pattern specifying an exponential or linear increase/decrease.

As an example of Table 5, the relay link zone change information about the next frame can be sent to the RS by a DL-MAP message in the relay link zone of the current frame. Table 6 below shows an RS_DL-MAP message with the relay link zone change information.

TABLE 5

| Syntax | Size (bits) | Notes |
| --- | --- | --- |
| DL_Frame_Prefix( ) { | | |
| used subchannel bitmap | 6 | Bit #0: subchannel group 0 |
| | | Bit #1: subchannel group 1 |
| | | Bit #2: subchannel group 2 |
| | | Bit #3: subchannel group 3 |
| | | Bit #4: subchannel group 4 |
| | | Bit #5: subchannel group 5 |
| repetition_coding_indication | 2 | 0b00: no repetition coding on DL-MAP |
| | | 0b01: repetition coding of 2 used on DL-MAP |
| | | 0b10: repetition coding of 4 used on DL-MAP |
| | | 0b11: repetition coding of 6 used on DL-MAP |
| coding_indication | 3 | 0b000: CC encoding used on DL-MAP |
| | | 0b001: BTC encoding used on DL-MAP |
| | | 0b010: CTC encoding used on DL-MAP |
| | | 0b011: ZT CC encoding used on DL-MAP |
| | | 0b100: CC encoding with optional interleaver |
| | | 0b101: LDPC encoding used on DL-MAP |
| | | 0b110-0b111: reserved |
| DL-MAP length | 8 | |
| OFDMA symbol offset | 5 | 0b00000: no change |
| | | 0b0xxxx: xxx symbols increase |
| | | 0b1xxxx: xxx symbols decrease |
| } | | |

TABLE 6

| Syntax | Size (bits) | Notes |
|---|---|---|
| RS DL MAP format( ) { | | |
|   Compressed map indicator | 2 | Set to binary 11 |
|   Reserved | 1 | Shall be set to zero |
|   RS UL MAP appended | 1 | Indicates that RS UL MAP follows RS DL MAP |
|   Next RS DL zone change indicator | 1 | Indicates whether the RS DL zone is changed in next frame |
|   MAP message length | 10 | |
|   OFDMA PHY synchronization field | 32 | Frame duration code (8 bits), Frame number (24 bits) |
|   DCD count | 8 | |
|   Operator ID | 8 | |
|   Sector ID | 8 | |
|   No. OFDMA symbol | 8 | Number of OFDMA symbols in RS DL subframe including all permutation zone |
|   DL IE count | 8 | |
|   For (i=0; i<DL IE count; i++) { | | |
|     DL-MAP_IE( ) | Variable | |
|   } | | |
|   If (Next RS DL zone change indicator==1) { | | |
|     OFDMA symbol offset | 4 | 0xxxx: xxxx symbols increase<br>1xxxx: xxxx symbols decrease |
|   } | | |
| } | | |

In Table 6, the RS_DL-MAP message includes Compressed map indicator indicating that this message is a compressed MAP, RS UL MAP appended indicating whether an RS_UL-MAP message providing MAP information about the relay link zone 323 of the UL subframe 320 of the BS frame 300 is present or not, Next RS DL zone change indicator indicating whether the start offset of the relay link zone changes in the next frame, OFDMA symbol offset indicating the increase/decrease of the start offset of the relay link zone in the next frame, MAP message length indicating the length of the RS_DL-MAP message, No. OFDMA symbol indicating the number of OFDMA symbols in the relay link zone 313 of the DL subframe 310 in the BS frame 300, and a plurality of DL-MAP_IEs that provide MAP information about the relay link zone 313. The value of the OFDMA symbol offset is set according to a link variation. The increase/decrease of the start offset of the relay link zone in the next frame can be performed in a pattern specifying an exponential or linear increase/decrease other than a sequential increase/decrease.

In the presence of the RS UL MAP that provides MAP information about the relay link zone 323 of the UL subframe 320 in the BS frame 300 in Table 6, the RS_UL-MAP has the following configuration.

TABLE 7

| Syntax | Size (bits) | Notes |
|---|---|---|
| RS UL MAP format( ) { | | |
|   UCD count | 8 | |
|   Allocation start time | 32 | |
|   No. OFDMA symbols | 8 | Number of OFDMA symbols in the RS UL subframe |
|   while (map data remains) { | | |
|     UL-MAP_IE( ) | Variable | |
|   } | | |
|   If !(byte boundary) { | | |
|     padding nibble | 4 | Padding to reach byte boundary |
|   } | | |
| } | | |

In Table 7, the RS_UL-MAP message contains UCD count indicating the count of Uplink Channel Descriptor (UCD) messages that include profile information about bursts sent in the relay link zone 323 of the UL subframe 320 in the BS frame 300, Allocation start time indicating the allocation start time of the relay link zone 323, No. OFDMA symbols indicating the number of OFDMA symbols in the relay link zone 323, and a plurality of UL-MAP IEs that provide MAP information about the relay link zone 323.

As described above, the relay link zone change information can be sent to the RS in the FCH message or the MAP message. Alternatively, the relay link zone change information can be delivered on a newly defined message configured as follows.

TABLE 8

| Syntax | Size (bits) | Notes |
|---|---|---|
| RS_DL_zone_change_IE( ) { | | |
|   Extended DIUC/Extended-2 DIUC | 4/8 | BS_RS_DL_zone_change |
|   Length | 4 | |
|   OFDMA symbol offset | 4 | 0xxxx: xxxx symbols increase<br>1xxxx: xxxx symbols decrease |
| } | | |

In Table 8, RS_DL_zone change_IE contains OFDMA symbol offset indicating the size of an increased/decrease in the start offset of the relay link zone in the next frame. The OFDMA symbol offset is set to a value based on a pattern specifying an exponential or linear increase/decrease other than a sequential increase/decrease.

Figure 5:
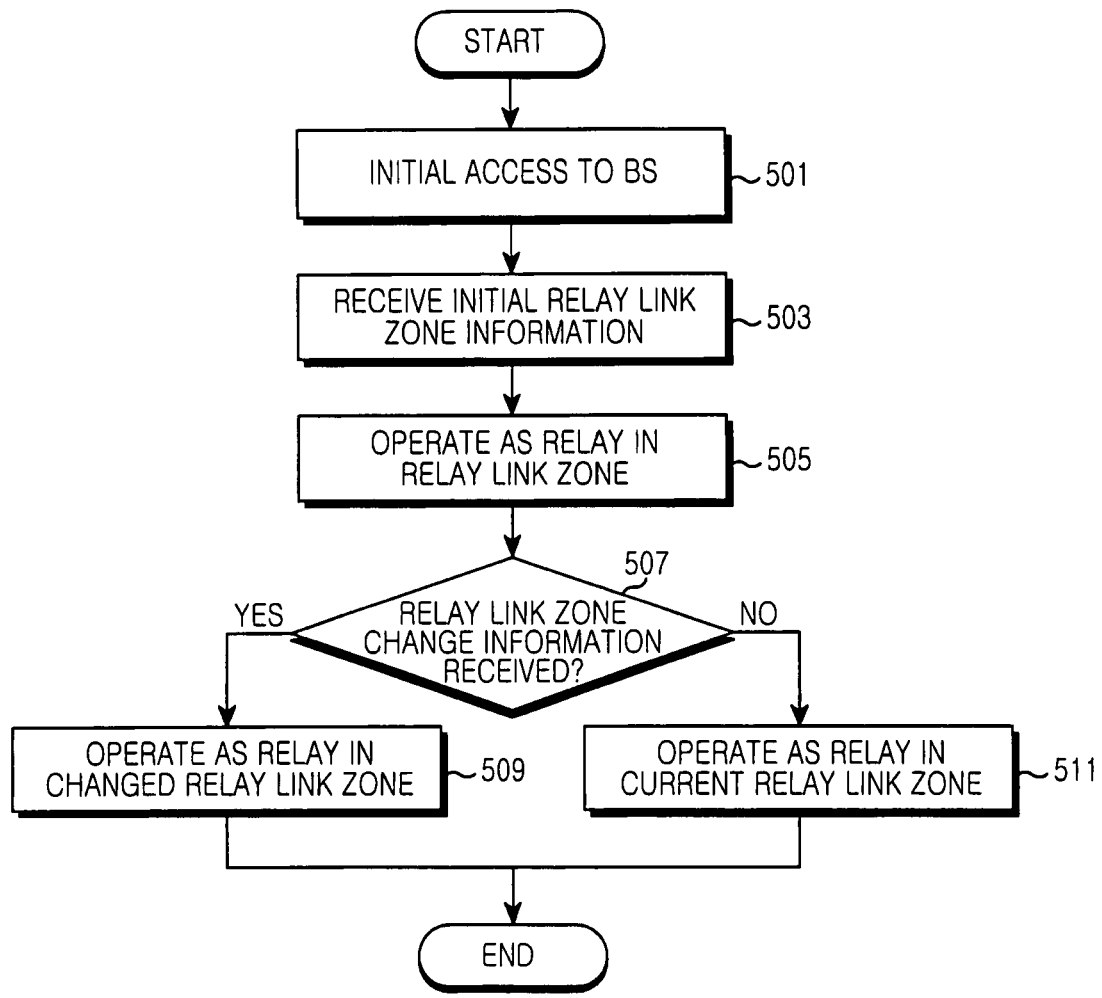
FIG. 5 is a flowchart illustrating an operation of an RS for receiving relay link zone information from a BS in the multi-hop relay BWA communication systems according to the present invention.

FIG. 5 shows an operation of an RS for receiving relay link zone information from a BS in the multi-hop relay BWA communication systems according to the present invention. The RS initially accesses the BS in the first zones 311 and 321 of the BS frame 300 shown in (A) of FIG. 3 in step 501. The RS, which has been activated as a relay after the initial access, receives STC_DL_ZONE_IE shown in Table 1 from the BS and acquires relay link zone information about the DL relay link zone 313 of the BS frame 300 from the STC_DL_ZONE_IE in step 503. Another way to acquire the relay link zone information is to receive AAS_DL_IE including an RS DL zone indicator from the BS. A third way to acquire the relay link zone information is to receive an FCH with an RS DL zone indicator and a DL MAP with a Gap/PAPR reduction IE.

In step 505, the RS receives a DL signal from the BS in a relay link zone indicated by the relay link zone information. Then the RS monitors reception of a relay link zone change message from the BS in step 507. The relay link zone change message can be DL_Frame_Prefix shown in Table 5, RS_DL-MAP shown in Table 6, or RS_DL_zone_change_IE shown in Table 8.

Upon receipt of the relay link zone change message, the RS acquires information about a changed relay link zone from the received message and performs an RS operation in the changed relay link zone in step 509. If the RS does not receive the relay link zone change message, it performs an RS operation in the current relay link zone in step 511.

With reference to FIGS. 4 and 5, the above description is made of the BS that performs an initial access operation with the RS and the RS that performs an RS operation after the initial access.

If the RS is mobile, it should continue relaying signals to lower nodes under its control even when it moves from the serving BS to a target BS. Accordingly, the RS needs to have knowledge of a relay link zone of the target BS for communications with the target BS after the handover.

Figure 6:
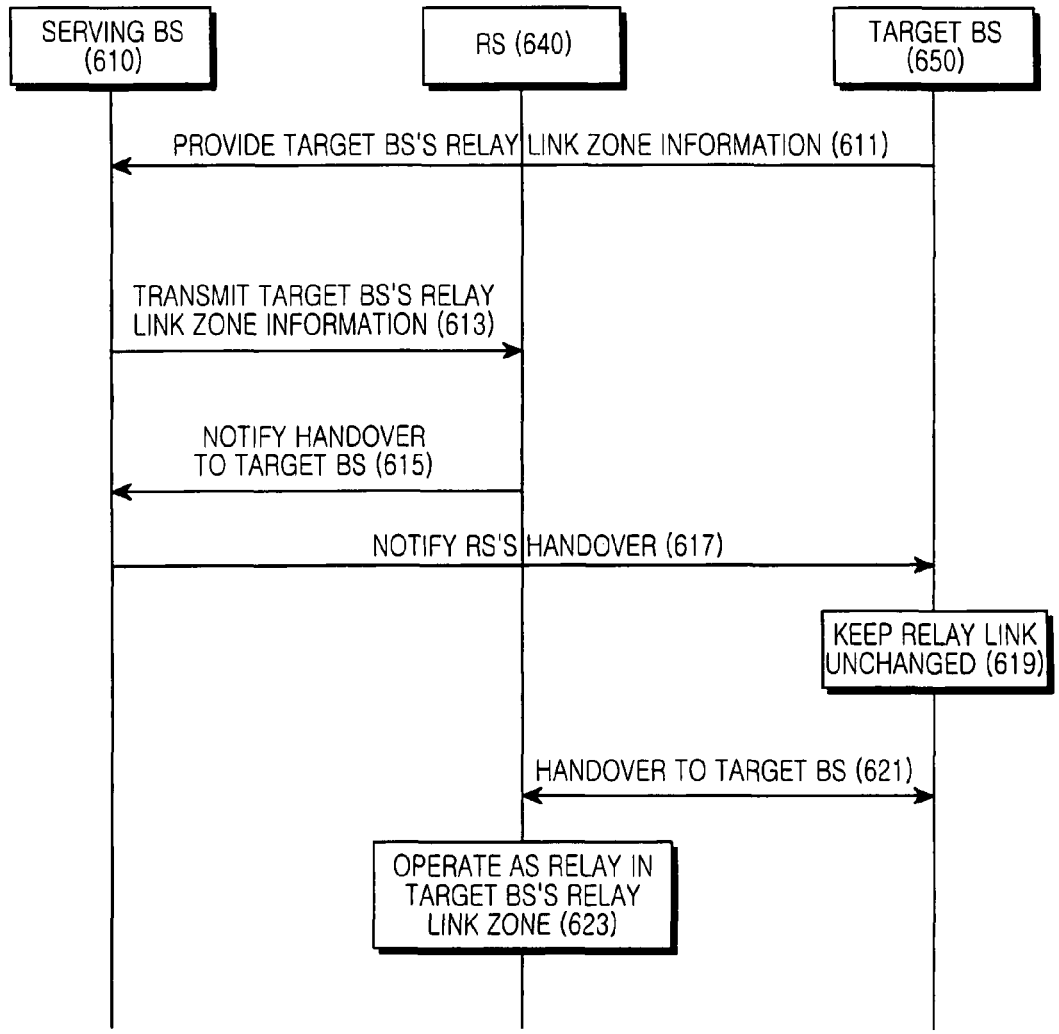
FIG. 6 is a diagram illustrating a signal flow for providing relay link zone information regarding a target BS to an RS that performs a handover to the target BS in the multi-hop relay BWA communication systems according to the present invention.

FIG. 6 shows a signal flow for providing relay link zone information regarding a target BS to an RS that performs a handover to the target BS in the multi-hop relay BWA communication systems according to the present invention. A target BS 650 sends its relay link zone information to a serving BS 610 over a backbone network in step 611. The relay link zone information is configured as follows.

TABLE 9

| Name | Size (bits) | Notes |
|---|---|---|
| DL zone symbol offset | 8 | Denotes the start of RS DL zone (starting from 0) |
| DL zone permutation | 2 | 0b00: PUSC permutation<br>0b01: FUSC permutation<br>0b10: Optional FUSC permutation<br>0b11: Optional adjacent subcarrier permutation |
| } | | |

In Table 9, the relay link zone information received from the target BS contains DL zone symbol offset indicating a first symbol of a DL relay link zone of the target BS and DL zone permutation indicating a permutation type applied to the DL relay link zone.

In step 613, the serving BS 610 sends the relay link zone information shown in Table 9 to an RS 640. The relay link zone information may be delivered in a Mobile Neighbor Advertisement (MOB_NBR-ADV) message that the serving BS 610 sends to provide neighbor BS information to the RS 640. Or the relay link zone information may be included in a handover request message that the BS sends to the RS in order to request a handover, or a handover response message that the BS sends to the RS in response to a handover request message received from the RS.

The RS 640 notifies the serving BS 610 of a handover to the target BS 650 in step 615. In step 617, the serving BS 610 notifies the target BS 650 of the handover of the RS 640 by a handover notification message with the relay link zone information regarding the target BS 650 known to the RS 640.

Therefore, the target BS 650 keeps the relay link zone unchanged until the handover is completed in step 619. In the mean time, the RS 640 performs the handover to the target BS 650 in step 621 and continues serving as a relay in the service area of the target BS 650 using the relay link zone information of the target BS 650 in step 623.

The above description focuses on how to send information about relay link zones corresponding to the second zones 313 and 323, particularly the DL relay link zone 313 in the BS frame 300 shown in (A) of FIG. 3. Information about the UL relay link zone 323 can be provided to the RS in an RS_UL-MAP message without the RS DL zone indicator that exists in the STC_DL_ZONE_IE of Table 1 or the AAS_DL_IE. That is, the RS can acquire information about the UL relay link zone 323 for every frame, referring to Allocation start time and No. OFDMA symbols in the RS_UL-MAP message shown in Table 7.

An overall operation for sending/receiving information about relay link zones between a BS and an RS in the multi-hop relay BWA communication system has been described. Now a description will be made of the structure of the BS and the RS for sending/receiving the relay link zone information between them. The BS and the RS with the same interface module (i.e. communication module) have the same configuration. Thus, the operations of the BS and the RS will be described in the context of a single device shown in FIG. 7. While the following description is made in a Time Division Duplex (TDD)-OFDMA system, it is to be clearly understood that the present invention is easily applicable to a Frequency Division Duplex (FDD)-OFDMA system, a hybrid TDD-FDD system, and other cellular systems using different resource division schemes.

Figure 7:
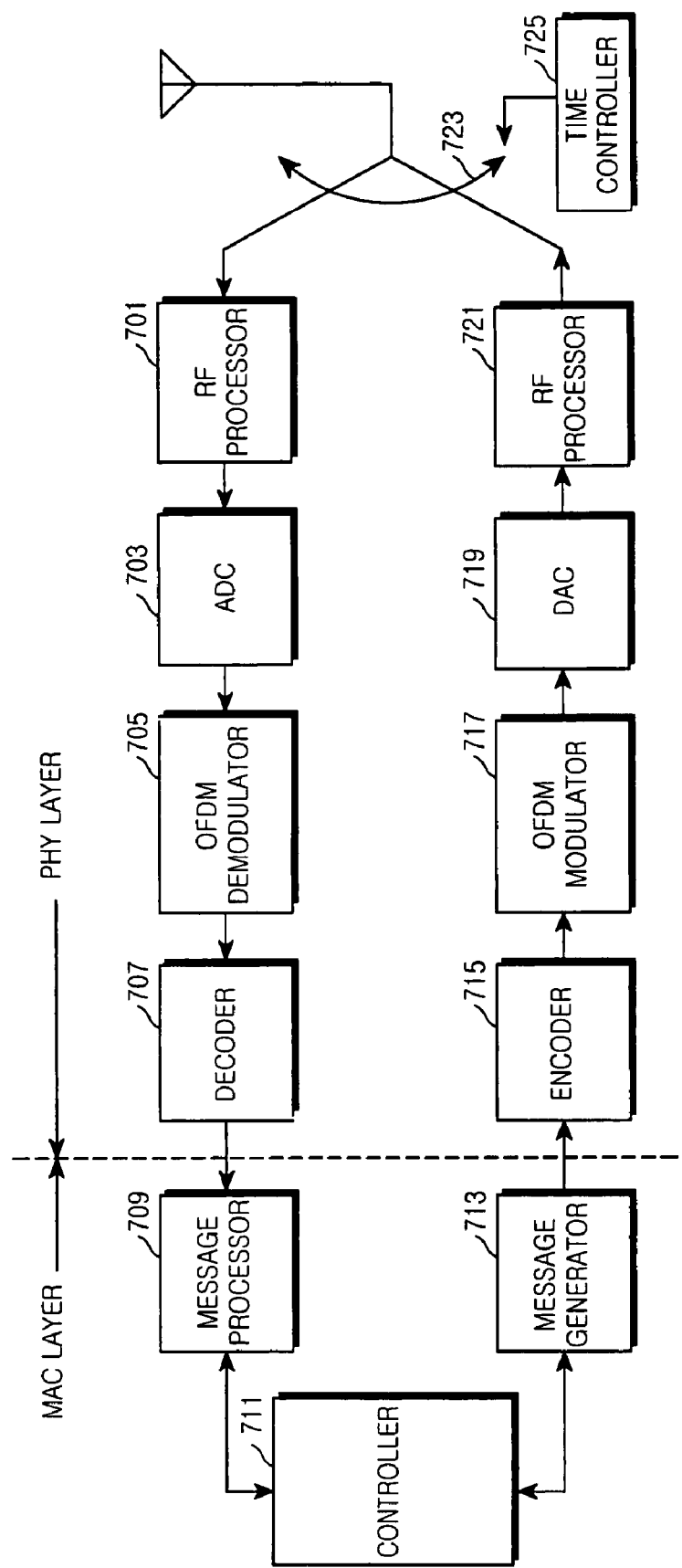
FIG. 7 is a block diagram of a BS or an RS according to the present invention.

FIG. 7 shows a BS or an RS according to the present invention. The BS (or the RS) includes a Radio Frequency (RF) processor 701, an Analog-to-Digital Converter (ADC) 703, an OFDM demodulator 707, a message processor 709, a controller 711, a message generator 713, an encoder 715, an OFDM modulator 717, a Digital-to-Analog Converter (DAC) 719, an RF processor 721, a switch 723, and a timing controller 725.

The timing controller 725 controls the switching of the switch 723 based on time synchronization. For example, during a signal reception period, the timing controller 725 controls the switch 723 to switch an antenna to the RF processor 701 at a receiver side. During a signal transmission period, the timing controller 725 controls the switch 723 to switch the antenna to the RF processor 721 at a transmitter side.

During the reception, the RF processor 701 downconverts an RF signal received through the antenna to an analog baseband signal. The ADC 703 converts the analog baseband signal to sample data. The OFDM demodulator 705 converts the sample data to frequency data by Fast Fourier Transform (FFT) and selectively outputs data on intended subcarriers from among the frequency data.

The decoder 707 demodulates and decodes the OFDM-demodulated data received from the OFDM demodulator 705 at a Modulation and Coding Scheme (MCS) level.

The message processor 709 analyzes a control message received from the decoder 707 and provides the analysis result to the controller 711. The controller 711 appropriately processes the information received from the message processor 709, and generates and provides transmission information to the message generator 713. The message generator 713 generates a message with the received information.

The encoder 715 in a physical layer encodes and modulates the data received from the message generator 713 at an MCS level. The OFDM modulator 717 converts the coded data to sample data (i.e. an OFDM symbol) by Inverse Fast Fourier Transform (IFFT). The DAC 719 converts the sample data to an analog signal. The RF processor 721 upconverts the analog signal to an RF signal and sends the RF signal through the antenna.

The controller 711 is a protocol controller for controlling the message processor 709 and the message generator 713. That is, the controller 711 can implement the functions of the message processor 709 and the message generator 713. While the message processor 709 and the message generator 713 are shown separately for describing their functions distinguishably, their functions can be partially or wholly incorporated into the controller 711.

The controller 711 receives necessary information from a function block in the physical layer or provides a control signal to a function block during protocol processing.

Operations of the BS and the RS will be described in the context of the configuration shown in FIG. 7. The following description focuses on processing control messages in a Media Access Control (MAC) layer.

During the BS operation, the controller 711 provides overall control in relation to a change in a relay link zone. After initial access by an RS, the controller 711 generates information about a relay link zone of a BS DL subframe in which to communicate with the RS. The message generator 713 generates a message including the relay link zone information received from the controller 711 and provides the message to the physical layer. This message can be the zone switch message STC_DL_ZONE_IE shown in Table 1, the AAS_DL_IE shown in Table 2, or a Gap/PAPR reduction IE. When the Gap/PAPR reduction IE carries the relay link zone information, an FCH message may have an RS DL zone indicator indicating that the Gap/PAPR reduction IE includes the relay link zone information.

The controller 711 determines whether to change the relay link zone in size. The controller 711 generates relay link zone change information when the controller 711 is determining to change the relay link zone size. The message generator 713 generates a message including the relay link zone change information received from the controller 711 and provides the message to the physical layer. The message with the relay link zone change information is the FCH message shown in Table 5 sent from the BS to the RS in a current frame, the RS DL MAP message shown in Table 6, or the newly defined message shown in Table 8.

Upon receipt of a message with relay link zone information regarding a target BS (Table 9) to which a mobile RS performs a handover over a backbone network, the controller 711 extracts relay link zone information of the target BS from the received message. The message generator 713 generates a message including the relay link zone information of the target BS received from the controller 711 and provides the relay link zone information to the physical layer. This message can be a MOB_NBR-ADV message designed to provide neighbor BS information to the RS, a handover request message from the BS for requesting a BS-initiated handover, or a handover response message that the BS sends to the mobile RS in response to a handover request message received from the RS.

The controller 711 also generates information about a UL relay link zone in which the BS communicates with the RS. The message generator 713 generates a message including the UL relay link zone information received from the controller 711 and provides it to the physical layer. This message can be the RS UL MAP message shown in Table 4.

The messages generated from the message generator 713 are processed in transmittable forms in the physical layer and sent through the antenna.

During the RS operation, the message processor 709 analyzes a control message received from an MS or the BS and provides the analysis result to the controller 711. Upon receipt of a message with DL relay link zone information (STC_DL_Zone_IE, AAS_DL_IE, or Gap/PAPR reduction IE), or a message with DL relay link zone change information (DL_Frame_prefix, RS DL MAP, or RS_DL_zone_change_IE) from the BS according to the present invention, the message processor 709 extracts control information from the received message.

The controller 711 determines a relay link zone in which to communicate with the BS based on the control information received from the message processor 711 and provides overall control to the RS so the RS acts as a relay in synchronization to the relay link zone.

Upon receipt of a message with relay link zone information of a target BS shown in Table 9 from the serving BS during a handover, the message processor 709 extracts the relay link zone information of the target BS from the received message. The controller 711 determines a relay link zone in which to communicate with the target BS based on the control information received form the message processor 711 and provides overall control to the RS so the RS acts as a relay in synchronization to the relay link zone of the target BS after the handover.

As described above, the present invention provides a method for providing an RS with information about a relay link zone in which a BS communicates with the RS in a multi-hop relay BWA communication system. Because the relay link zone can be changed within a limited frame dynamically according to a cell environment, limited resources are efficiently utilized.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A communication method for a Base Station (BS) in a multi-hop relay cellular communication system, the method comprising:
    performing a network entry procedure with a Relay Station (RS) during an initial access of the RS to the BS;
    generating a message including relay link zone information regarding a relay link zone in which the BS communicates with the RS;
    processing the message in a physical layer; and
    transmitting the processed message to the RS;
    wherein the message includes a relay zone indicator indicating whether the relay link zone information is included.

2. A communication method for a Base Station (BS) in a multi-hop relay cellular communication system, the method comprising:
    performing a network entry procedure with a Relay Station (RS) during an initial access of the RS to the BS;
    generating a message including relay link zone information regarding a relay link zone in which the BS communicates with the RS;
    processing the message in a physical layer; and transmitting the processed message to the RS;
wherein the message includes a relay zone indicator indicating whether one of a Gap and a Peak-to-Average Power Ratio (PAPR) reduction region is allocated.

3. The communication method of claim 2, wherein a Frame Control Header (FCH) message includes an RS downlink zone indicator indicating that the relay link zone information is included in the message when the message includes the relay link zone information.

4. A communication method for a Base Station (BS) in a wireless communication system, the method comprising:
    determining whether to change a relay link zone in which the BS communicates with a Relay Station (RS);
    generating a message including relay link zone change information when the BS determines to change the relay link zone, wherein the message includes information indicating a start of a relay link zone in a next frame;
    processing the message in a physical layer; and
    broadcasting the processed message to RSs.

5. The communication method of claim 4, wherein the message processing and broadcasting comprises transmitting the message in one of a Relay Frame Control Header (R-FCH) message and a MAP message including relay link zone allocation information.

6. A communication method for a Base Station (BS) in a wireless communication system, the method comprising:
    receiving relay link zone information defining a relay link zone of a frame through which a target BS communicates with a Relay Station (RS) from the target BS, when the RS performs a handover;
    generating a message including the relay link zone information regarding the target BS; and
    processing the message in a physical layer and transmitting the processed message to the RS.

7. The communication method of claim 6, wherein the message includes at least one of information indicating a start of a relay link zone for communications between the RS and the target BS and information indicating a permutation type for the relay link zone.

8. A communication method for a Relay Station (RS) in a multi-hop relay cellular communication system, the method comprising:
    performing a network entry procedure with a Base Station (BS) during an initial access to the BS;
    receiving a message including relay link zone information about a relay link zone for communications between the RS and the BS; and
    performing an RS operation in the relay link zone indicated by the relay link zone information;
    wherein the message includes a relay zone indicator indicating whether the relay link zone information is included.

9. A communication method for a Relay Station (RS) in a multi-hop relay cellular communication system, the method comprising:
    performing a network entry procedure with a Base Station (BS) during an initial access to the BS;
    receiving a message including relay link zone information about a relay link zone for communications between the RS and the BS; and
    performing an RS operation in the relay link zone indicated by the relay link zone information;
    wherein the message includes a relay zone indicator indicating whether one of a Gap and a Peak-to-Average Power Ratio (PAPR) reduction region is allocated.

10. The communication method of claim 9, wherein a Frame Control Header (FCH) message includes an RS downlink zone indicator indicating that the relay link zone information is included in the message when the message includes the relay link zone information.

11. A communication method for a Relay Station (RS) in a wireless communication system, the method comprising:
    monitoring reception of a message including relay link zone change information about a relay link zone for communications between the BS and the RS, wherein the message includes information indicating a start of a relay link zone in a next frame;
    detecting a changed relay link zone from the message, upon receipt of the message; and
    performing an RS operation in a relay link zone indicated by the relay link zone change information.

12. The communication method of claim 11, wherein the message reception comprises receiving the message in one of a Relay Frame Control Header (R-FCH) message and a MAP message including relay link zone allocation information.

13. A communication method for a Relay Station (RS) in a wireless communication system, the method comprising:
    receiving a message including relay link zone information defining a relay link zone of a frame through which a target Base Station (BS) communicates with the RS, when the RS performs a handover;
    detecting a relay link zone for communications between the RS and the target BS from the received message; and
    performing an RS operation in the relay link zone after the handover.

14. The communication method of claim 13, wherein the message includes at least one of information indicating a start of the relay link zone for communications between the RS and the target BS and information indicating a permutation type for the relay link zone.

15. A communication method in a multi-hop relay cellular communication system, the method comprising:
    transmitting a first message including relay link zone information to a Relay Station (RS) by a Base Station (BS) during an initial access of the RS to the BS;
    detecting the relay link zone information from the first message by the RS; and
    performing an RS operation in a relay link zone indicated by the relay link zone information by the RS;
    wherein the first message includes a relay zone indicator indicating whether the relay link zone information is included.

16. The communication method of claim 15, when the relay link zone is changed, further comprising:
    broadcasting a second message including relay link zone change information about the relay link zone to RSs that communicate with the BS in the relay link zone by the BS;
    detecting the relay link zone change information from the second message by the RS; and
    performing an RS operation in a changed relay link zone indicated by the relay link zone change information by the RS.

17. The communication method of claim 16, wherein the second message includes information indicating a start of a relay link zone in a next frame.

18. The communication method of claim 16, wherein the second message broadcasting comprises broadcasting the second message in one of a Relay Frame Control Header (R-FCH) message and a MAP message including relay link zone allocation information.

19. The communication method of claim 15, when the RS performs a handover, further comprising:

transmitting a third message including relay link zone information regarding a target BS to the RS by the BS;

detecting a relay link zone for communications between the target BS and the RS from the third message by the RS; and performing an RS operation in the relay link zone after the handover.

20. The communication method of claim 19, wherein the third message includes at least one of information indicating a start of the relay link zone for communications between the RS and the target BS and information indicating a permutation type for the relay link zone.

21. A communication method in a multi-hop relay cellular communication system, the method comprising:

transmitting a first message including relay link zone information to a Relay Station (RS) by a Base Station (BS) during an initial access of the RS to the BS;

detecting the relay link zone information from the first message by the RS; and performing an RS operation in a relay link zone indicated by the relay link zone information by the RS;

wherein the first message includes a relay zone indicator indicating whether one of a Gap and a Peak-to-Average Power Ratio (PAPR) reduction region is allocated.

22. The communication method of claim 21, wherein a Frame Control Header (FCH) message includes an RS downlink zone indicator indicating that the relay link zone information is included in the message when the message includes the relay link zone information.

23. An apparatus of a Base Station (BS) in a multi-hop relay cellular communication system, the apparatus comprising:

a message generator for generating a first message including relay link zone information about a relay link zone for communications between the BS and a Relay Station (RS); and a transmitter for processing the first message in a physical layer and transmitting the processed message to the RS during an initial access of the RS;

wherein the first message includes a relay zone indicator indicating whether the relay link zone information is included.

24. The apparatus of claim 23, wherein the message generator generates a second message including relay link zone change information about the relay link zone, and the transmitter processes the message in a physical layer and broadcasts the processed message to RSs that communicate with the BS in the relay link zone when the relay link zone is changed.

25. The apparatus of claim 24, wherein the second message includes information indicating a start of a relay link zone in a next frame.

26. The apparatus of claim 24, wherein the transmitter broadcasts the second message in one of a Relay Frame Control Header (R-FCH) message and a MAP message including relay link zone allocation information.

27. The apparatus of claim 23, wherein the message generator generates a third message including relay link zone information regarding a target BS, and the transmitter processes the third message in a physical layer and transmits the processed third message to the RS when the RS performs a handover.

28. The apparatus of claim 27, wherein the third message includes at least one of information indicating a start of a relay link zone for communications between the RS and the target BS and information indicating a permutation type for the relay link zone.

29. An apparatus of a Base Station (BS) in a multi-hop relay cellular communication system, the apparatus comprising:

a message generator for generating a first message including relay link zone information about a relay link zone for communications between the BS and a Relay Station (RS); and a transmitter for processing the first message in a physical layer and transmitting the processed message to the RS during an initial access of the RS;

wherein the first message includes a relay zone indicator indicating whether one of a Gap and a Peak-to-Average Power Ratio (PAPR) reduction region is allocated.

30. The apparatus of claim 29, wherein a Frame Control Header (FCH) message includes an RS downlink zone indicator indicating that the relay link zone information is included in the message when the message includes the relay link zone information.

31. An apparatus of a Relay Station (RS) in a multi-hop relay cellular communication system, the apparatus comprising:

a controller for receiving a first message including relay link zone information about a relay link zone for communications between the RS and a Base Station (BS) during an initial access to the BS and controlling a transceiver to perform an RS operation in the relay link zone indicated by the relay link zone information; and the transceiver for communicating with the BS in the relay link zone;

wherein the first message includes a relay zone indicator indicating whether the relay link zone information is included.

32. The apparatus of claim 31, wherein upon receipt of a second message including relay link zone change information about the relay link zone from the BS, the controller controls the transceiver to perform an RS operation in a changed relay link zone indicated by the relay link zone change information.

33. The apparatus of claim 32, wherein the second message includes information indicating a start of a relay link zone in a next frame.

34. The apparatus of claim 32, wherein the transceiver receives the second message in one of a Relay Frame Control Header (R-FCH) message and a MAP message including relay link zone allocation information.

35. The apparatus of claim 31, upon receipt of a third message including relay link zone information regarding a target Base Station (BS) to which the RS performs a handover, the controller detects a relay link zone for communications between the RS and the target BS from the third message and controls the transceiver to perform an RS operation in the relay link zone after the handover.

36. The apparatus of claim 35, wherein the third message includes at least one of information indicating a start of the relay link zone for communications between the RS and the target BS and information indicating a permutation type for the relay link zone.

37. An apparatus of a Relay Station (RS) in a multi-hop relay cellular communication system, the apparatus comprising:

a controller for receiving a first message including relay link zone information about a relay link zone for communications between the RS and a Base Station (BS) during an initial access to the BS and controlling a transceiver to perform an RS operation in the relay link zone indicated by the relay link zone information; and the transceiver for communicating with the BS in the relay link zone;

wherein the message includes a relay zone indicator indicating whether one of a Gap and a Peak-to-Average Power Ratio (PAPR) reduction region is allocated.

38. The apparatus of claim 37, wherein a Frame Control Header (FCH) message includes an RS downlink zone indicator indicating that the relay link zone information is included in the message when the message includes the relay link zone information.

* * * * *